United States Patent
Ilse et al.

(10) Patent No.: US 7,025,921 B2
(45) Date of Patent: Apr. 11, 2006

(54) METHOD FOR PRODUCTION OF A HYBRID COMPONENT

(75) Inventors: Alfred Ilse, Nurenberg (DE); Manfred Bartl, Ingolstadt (DE)

(73) Assignee: ITM International Tools and Moulds GmbH, (DE)

( * ) Notice: Subject to any disclaimer, the term of this patent is extended or adjusted under 35 U.S.C. 154(b) by 52 days.

(21) Appl. No.: 10/343,120

(22) PCT Filed: Jun. 16, 2001

(86) PCT No.: PCT/EP01/06826

§ 371 (c)(1),
(2), (4) Date: Nov. 21, 2003

(87) PCT Pub. No.: WO01/98052

PCT Pub. Date: Dec. 27, 2001

(65) Prior Publication Data

US 2004/0070113 A1    Apr. 15, 2004

(30) Foreign Application Priority Data

Jun. 21, 2000   (DE) .............................. 100 29 450

(51) Int. Cl.
*B29C 45/14*    (2006.01)
*B29C 45/16*    (2006.01)
(52) U.S. Cl. .............. 264/259; 264/264; 264/267; 264/271.1; 264/279.1; 264/328.1
(58) Field of Classification Search .............. 264/259, 264/261, 267, 271.1, 279.1, 328.1
See application file for complete search history.

(56) References Cited

U.S. PATENT DOCUMENTS

| | | | |
|---|---|---|---|
| 2,732,613 A | 1/1956 | Renholts | 29/149.5 |
| 3,827,130 A * | 8/1974 | Baumann | 29/421 |
| 4,075,395 A | 2/1978 | Ohnishi | 428/542 |

(Continued)

FOREIGN PATENT DOCUMENTS

DE    26 09 084 A1    9/1976

(Continued)

OTHER PUBLICATIONS

International Search Report re PCT application no. PCT/EP01/06826, mailed Nov. 8, 2001.

*Primary Examiner*—Stefan Staicovici
(74) *Attorney, Agent, or Firm*—Cook, Alex, McFarron, Manzo, Cummings & Mehler, Ltd..

(57) ABSTRACT

The invention relates to the production of a hybrid component, whereby a piece of metal sheet (1) is a least partly coated with plastic by injection molding, by means of the following steps: a) placing the metal sheet (1) in one mold half of an injection mold, b) closing the injection mold, such that a first mold cavity opposite an upper side (O) of the metal sheet (1) and a second mold cavity opposite an under side (U) of the metal sheet (1) are cut off from each other, c) treatment of the upper side (O) with plastic by means of at least a first sprue (9) to produce an essentially flat coating (4) connected to the metal sheet (1) and, finally, d) treatment of the under side (U) by means of at least one second sprue (10) to produce a reinforcing structure (6) connected to the metal sheet (1).

16 Claims, 2 Drawing Sheets

U.S. PATENT DOCUMENTS

Figure 1:
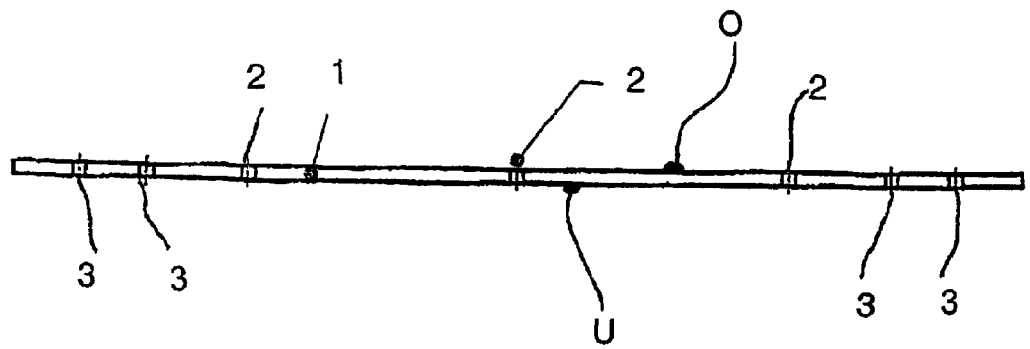

| | | | |
|---|---|---|---|
| 5,190,803 A | 3/1993 | Goldbach et al. | 428/138 |
| 5,695,699 A * | 12/1997 | Naritomi | 264/46.4 |
| 5,842,265 A | 12/1998 | Rink | 29/460 |
| 5,940,949 A | 8/1999 | Rink | 29/33 |
| 6,012,493 A * | 1/2000 | Remke et al. | 138/38 |
| 6,282,791 B1 * | 9/2001 | Patelczyk | 29/897.2 |
| 4,569,865 A * | 2/1986 | Placek | 428/31 |
| 4,860,425 A * | 8/1989 | Kunisaki et al. | 29/527.4 |

FOREIGN PATENT DOCUMENTS

| | | |
|---|---|---|
| DE | 40 11 263 A1 | 10/1990 |
| EP | 0 065 220 | 11/1982 |
| FR | 2 783 746 A1 | 3/2000 |
| GB | 698928 | 10/1953 |
| JP | 56-099657 | 8/1981 |
| JP | 58-208029 | 12/1983 |
| JP | 03-180311 | 8/1991 |

* cited by examiner

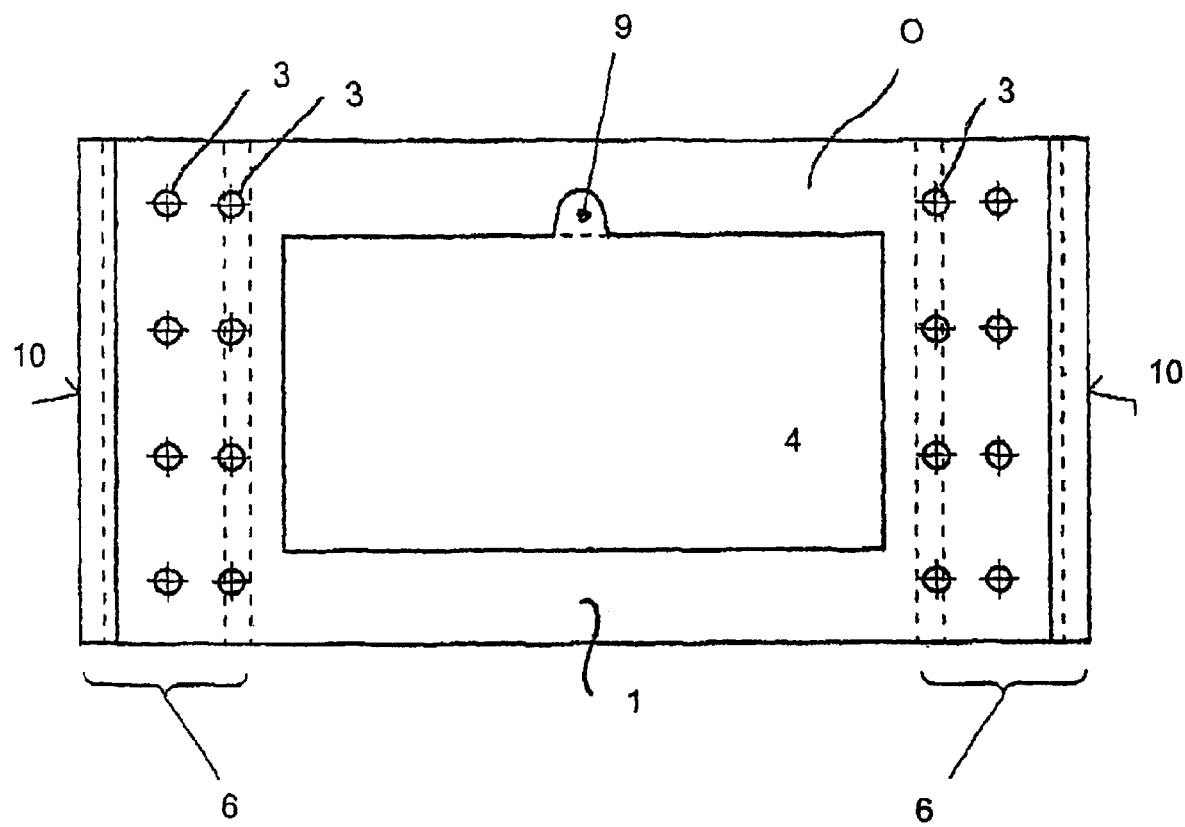
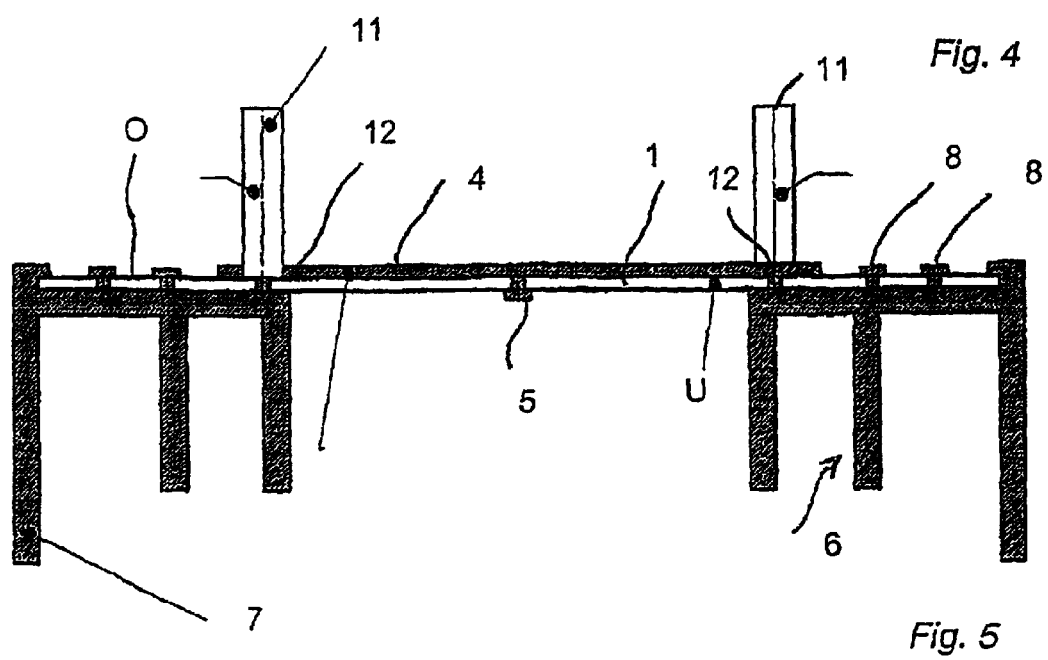

METHOD FOR PRODUCTION OF A HYBRID COMPONENT

The invention relates to a method for production of a hybrid component, in which a piece of metal sheet is at least partly coated with plastic by injection molding.

According to the prior art, what are known as hybrid components are being increasingly used in automobile construction. These are pieces of metal sheet which are partly coated with plastic by the injection-molding process. In this way, pieces of metal sheet can for example be provided on their one side with a reinforcing structure. If suitably designed, such hybrid components have greater rigidity; they are also lightweight. Furthermore, hybrid components can be produced with the accuracy known from the plastics injection-molding technique. Consequently, it is possible to mold complicated structures which cannot be produced by means of the conventional metal sheet forming technique.

DE-A-26 09 084 discloses a hybrid chassis, comprising a metal plate with synthetic resin supports. The mounting framework is arranged an a load-bearing framework for components in an electrical, electronic or mechanical device and comprises a carrying plate, which has at least one through-hole. Furthermore, the mounting framework comprises a synthetic resin support, which is integrally formed onto a first face of the carrying plate. The synthetic resin support has a portion in which the through-hole of the carrying plate is set and via which it is integrally connected by a synthetic resin composition to the opposite face of the carrying plate.

EP-B1-65 220 discloses a coated molded body with a metal plate, which is formed with a plurality of through-holes. The coated molded body has resin parts which are connected by resin filled into the through-holes and protrude on the opposite sides of the metal plate, the resin parts having a larger planar cross-sectional surface than that of the through-holes, and each resin part covering only one hole. A plurality of resin bodies are disclosed, in each case formed in one piece with one of the resin parts and kept independent of one another by the difference in the coefficient of thermal expansion between the resin parts and the metal plate. The coated molded body has, furthermore, resin parts not connected by resin.

DE-C2-195 06 159 discloses an injection-molding process for molding a workpiece with plastic. For this purpose, a mold with a mold cavity, a holding pin, an inlet for injecting the plastic into the mold cavity is used. The plastic is introduced into the mold cavity through a secondary inlet. After the plastic in the mold cavity has cured, the mold is separated and the plastic removed.

Hybrid components have nevertheless not yet been able to establish themselves as body components in automobile construction. One requirement here is that the visible sides, i.e. the sides which are visible in the fitted state, are also to be provided with a coating produced from the injection-molded plastic. This would make it possible to dispense with painting the hybrid component. So far, successful bonding of a defect-free coating with a small layer thickness to the metal sheet has not be accomplished.

The object of the invention is to overcome the disadvantages of the prior art. In particular, the intention is to provide a method by which a hybrid component having a coating can be produced with satisfactory quality.

A further aim of the invention is to produce the hybrid component as inexpensively and simply as possible.

According to the invention, a method for production of a hybrid component in which a piece of metal sheet is at least partly coated with plastic by injection molding is provided, comprising the following steps:

a) placing the piece of metal sheet into one mold half of an injection mold b) closing the injection mold, so that a first mold cavity, opposite an upper side of the piece of metal sheet, and a second mold cavity, opposite an underside of the piece of metal sheet, are cut off from each other, c) treatment of the upper side with plastic by means of at least one first sprue to produce an essentially flat coating connected to the piece of metal sheet and, subsequently, d) treatment of the underside with plastic by means of at least one second sprue to produce a reinforcing structure connected to the piece of metal sheet.

Cutting off the first mold cavity and second mold cavity from each other and the treatment of the upper side with plastic commencing earlier than the treatment of the underside with plastic achieve the advantage that a thin-walled coating of satisfactory quality can be produced on the upper side of the piece of metal sheet. The reinforcing structure essentially performs supporting, stiffening and retaining functions.

The piece of metal sheet is expediently treated with plastic in step item a in such a way that it neither changes its position nor is deformed in step item d. A flow of plastic emerging from a first sprue is advantageously directed straight onto the upper face, i.e. the flow of plastic is not injected parallel to the upper side into the first mold cavity. To prevent deforming of the metal sheet during spraying of the plastic onto the upper side, it is expedient to direct the flow of plastic perpendicularly or at an obtuse angle onto the upper side. According to a further refining feature, the coating is sprayed on in step item c in a thickness of at most 3 mm. The thickness of the coating may vary. It depends in particular on the respective rheological conditions.

According to a further refining feature, the piece of metal sheet is held in a clamping manner in the one mold half after placement, preferably by means of hydraulically movable holding means. In particular in the case of relatively small pieces of metal sheet, it is also possible to hold them magnetically in the mold half. To ensure positionally accurate placement, correspondingly formed fixed and movable bearings are provided on the piece of metal sheet and in the mold half. These may be formed on the mold as pins and on the piece of metal sheet as slots. According to a further refinement in terms of the method, the piece of metal sheet is held in place—after closing of the injection mold—in the injection mold by means of hold-down devices formed onto the mold halves.

To connect the coating to the piece of metal sheet, first apertures provided on the piece of metal sheet are expediently injected through, so that anchoring elements produced in one piece with the coating are formed. To connect the reinforcing structure to the piece of metal sheet, second apertures provided on the piece of metal sheet are injected through, so that second anchoring elements produced in one piece with the reinforcing structure are formed. The hold-down devices bearing against the upper side and underside are preferably coated in such a way that the coating is not directly connected to the first anchoring elements and/or the reinforcing structure is not directly connected to the second anchoring elements. The complete isolation of the coating from the reinforcing structure makes the production of particularly thin coatings possible.

According to a further refinement, the at least one hydraulically movable slide may be moved onto the upper side of the pieces of metal sheet before step item c to close a third aperture. The hydraulic slide may be retracted before or during step item d, so that the third aperture is opened toward the second mold cavity and the cavity formed by the retraction of the hydraulic slide in the first mold cavity is filled with plastic through said third aperture,—the aforementioned hydraulic slide is required in particular whenever complete separation of the coating from the reinforcing structure is not possible by means of the hold-down devices for design reasons.

In particular for the production of large hybrid components, for example front masks for automobiles, it is advantageous that a number of pieces of metal sheet are placed into the mold in such a way that apertures provided in them are in line with one another. The plastic penetrates through the apertures, so that a connection is created between the pieces of metal sheet.

Furthermore, it is expedient that the pieces of metal sheet are coated with an anti-corrosion layer. The durability of the hybrid component is increased as a result.

The first sprues are advantageously arranged outside a region of the coating that is visible in the fitted state. A satisfactory visual quality of the visible side is ensured in this way.

Fourth mold cavities may be opened after the filling of the first mold cavity and/or second mold cavity, and further plastic injected into said fourth mold cavities. The further plastic may be a plastic with different properties, for example a different color or a different elasticity. For example, after the spraying of the coating, a fourth cavity may be opened and a seal formed from elastic plastic sprayed onto the coating.

Figure 2:
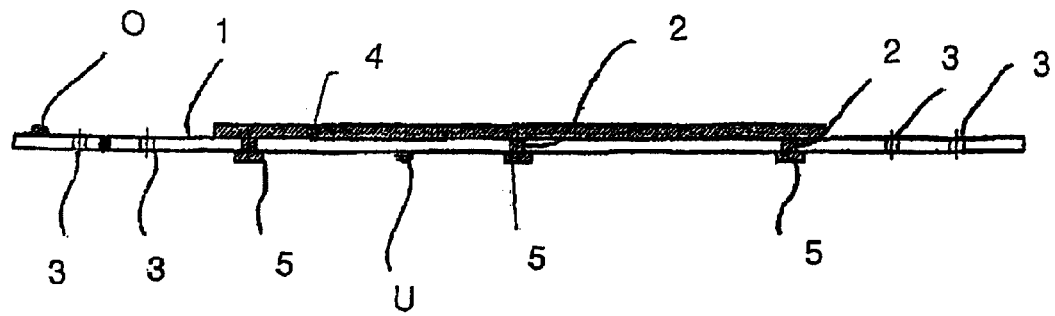
Figure 3:
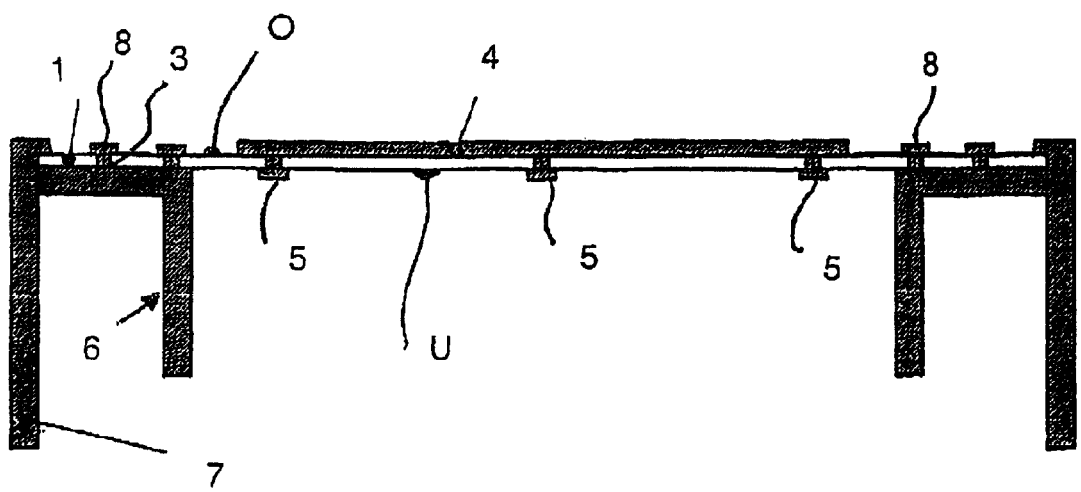

An exemplary embodiment of the method according to the invention is explained in more detail below on the basis of the drawings, in which:

FIG. 1 shows a schematic cross-sectional view through a metal sheet before the first injection-molding operation, FIG. 2 shows the metal sheet according to, FIG. 1 after the first injection-molding operation, FIG. 3 shows the metal sheet according to FIG. 2 after the second injection-molding operation, FIG. 4 shows a plan view of a hybrid component and FIG. 5 shows a schematic cross-sectional view of a further hybrid component.

In FIG. 1, a piece of metal sheet 1 is shown schematically in cross section. The piece of metal sheet 1 is provided with first apertures 2 and with second apertures 3. An upper side is denoted by O and an underside by U. The piece of metal sheet 1 is coated with an anti-corrosion layer (not shown here).

FIG. 2, a coating 4 has been sprayed onto the piece of metal sheet 1. First rivet-like anchoring elements 5 reach through the first apertures 2 and form thickenings on the underside U of the piece of metal sheet 1.

In FIG. 3, the situation after the injection-molding of a reinforcing structure 6 onto the underside U is shown. The reinforcing structure 6 has ribs 7 running essentially perpendicularly in relation to the underside. On the reinforcing structure 6, further rivet-like anchoring elements 8 extend through the second apertures 3 and have on the upper side O of the piece of metal sheet 1 further thickenings. As can be clearly seen from FIG. 3, there is no direct connection between the coating 4 and the reinforcing structure 6, i.e. no material bridge which is formed from plastic.

In figure 4, the piece of metal sheet 1 is shown in plan view. A visible region of the coating 4 is rectangularly formed. From the visible region there extends a tongue-like projection. Located here is a first sprue 9, which is formed by a heated first nozzle (not shown here). It goes without saying that, depending on the size of the coating formed, a number of first sprues may also be provided. The jet emerging from the first nozzle impinges essentially perpendicularly onto the upper side O of the piece of metal sheet 1. Second sprues 10 are formed as what are known as hot/cold runners. The jet of plastic emerging from second nozzles (not shown here) passes via the hot/cold runners to a second mold cavity, enclosing the reinforcing structure 6.

For production of a hybrid component according to the invention, the piece of metal sheet 1 is initially placed into a mold half (not shown here) of an injection mold. For the exact positioning of the piece of metal sheet, fixed and movable bearings are provided, for example in the form of pins provided on the one mold half and slots on the piece of metal sheet, which engage in one another when the piece of metal sheet is put in place. In order to hold the piece of metal sheet in the mold half, holding means attached to the one mold half are subsequently moved hydraulically onto the piece of metal sheet in such a way that it is held in a clamping manner. The injection mold is closed. The piece of metal sheet is then additionally held in a clamping manner in the injection mold by means of hold-down devices attached to the mold halves. A first mold cavity, enclosing the coating, is cut off from a second mold cavity, enclosing the reinforcing structure 6. Plastic is then injected directly onto the surface O of the piece of metal sheet via the first sprue, which is formed here as a "hot runner".

Subsequently, expediently 0.3–0.8 seconds after the first injection-molding operation, plastic is injected into the second mold cavity via the second sprues 10. The first mold cavity is filled with plastic earlier than the second mold cavity. This avoids the piece of metal sheet 1 being deformed or changing its position. It has proven to be particularly advantageous to direct the flow of plastic emerging from the hot runner into the first mold cavity directly onto the upper side O of the piece of metal sheet 1, to be precise expediently at an obtuse angle. By contrast, the reinforcing structure 6 is injection-molded conventionally via hot/cold runners.

For design reasons, it may be that the first apertures 2 and the second apertures 3 are to be placed in such a way that a material bridge is formed in the completed hybrid component between the coating 4 and the reinforcing structure 6. For this purpose—as can be seen from FIG. 5—after closing of the mold, hydraulic slides 11 are moved onto the upper side O in such a way that third apertures 12 are closed as a result. This state is shown on the left in FIG. 5. Then, as mentioned above, the coating 4 is sprayed via the hot runner 9 directed directly onto the upper side O. The plastic flows around the hydraulic slides 11. Subsequently or after the spraying of the coating 4, the hydraulic slides 11 are retracted. Plastic passes from the second mold cavity through the third apertures 12 into the first mold cavity, surrounding the coating 4. The cavities formed by the hydraulic slides 11 in the retracted state are filled.

Polyamide with added short glass fibers or polypropylene with long glass fibers is expediently used as the plastic. It goes without saying that any other injection-moldable plastic may also be used.

The method according to the invention is suitable in particular for production of highly integrated hybrid components for automobile construction. For example, a front mask for a motor vehicle can be produced quickly and at low cost. It is possible to mold seals for the radiator hood on the upper side of the front mask by means of the multi-component technique known per se. The reinforcing structure may have, for example, the mounting for a ventilation motor. Furthermore, elastic receptacle of a one-piece form may be provided for the radiator. Retaining lugs for cable or cable harnesses could be a component part of the reinforcing structure.

The invention claimed is:

1. A method for production of a hybrid component, in which a piece of metal sheet (1) is at least partly coated with plastic by injection molding, comprising the following steps:
    a) placing the piece of metal sheet (1) in one mold half of an injection mold,
    b) closing the injection mold, so that a first mold cavity, opposite an upper side (O) of the piece of metal sheet (1), and a second mold cavity, opposite an underside (U) of the piece of metal sheet (1), are cut off from each other,
    c) treating the upper side (O) with plastic by means of at least one first sprue (9) to produce an essentially flat coating (4) connected to the piece of metal sheet (1) and, subsequently,
    d) treating the underside (U) with plastic by means of at least one second sprue (10) to produce a reinforcing structure (6) connected to the piece of metal sheet (1).

2. The method as claimed in claim 1, wherein the piece of metal sheet (1) is treated with plastic in step c in such a way that it neither changes its position nor is deformed in step d.

3. The method as claimed in claim 1, wherein a flow of plastic emerging from a first sprue is directed onto the upper side (O).

4. The method as claimed in claim 1, wherein the flow of plastic is directed perpendicularly or at an obtuse angle onto the upper side (O).

5. The method as claimed in claim 1, wherein the coating (4) is injected or sprayed on in step c in a thickness of at most 3 mm.

6. The method as claimed in claim 1, wherein the piece of metal sheet is held in a clamping manner in the one mold half after placement.

7. The method as claimed in claim 1, wherein the piece of metal sheet (1) is held in place after closing of the injection mold by means of hold-down devices formed onto the hold halves.

8. The method as claimed in claim 1, wherein first apertures (2) provided on the piece of metal sheet (1) is injected through to connect the coating (4), so that first anchoring elements (5) and the coating (4) are formed in one piece.

9. The method as claimed in claim 8, wherein second apertures (3) provided on the piece of metal sheet (1) are injected through to connect the reinforcing structure (6), so that second anchoring elements (8) and the reinforcing structure (6) are formed in one piece.

10. The method as claimed in claim 9, wherein hold-down devices bearing against the upper side (O) and underside (U) are coated, so that the coating (4) is not directly connected to the second anchoring elements (8) and/or the reinforcing structure (6) is not directly connected to the first anchoring elements (5).

11. The method as claimed in claim 9, wherein at least one hydraulically movable slide (11) is moved onto the upper side (O) of the piece of metal sheet (1) before step c to close a third aperture (12).

12. The method as claimed in claim 11, wherein the hydraulic slide (11) is retracted before or during step d, so that the third aperture (12) is opened toward the second mold cavity and the cavity formed by the retraction of the hydraulic slide (11) in the first mold cavity is filled with plastic through said third aperture.

13. The method as claimed in claim 8, wherein a number of pieces of metal sheet (1) are placed in the injection mold in such a way that apertures provided in them are in line with one another.

14. The method as claimed in claim 1, wherein the pieces of metal sheet (1) are coated with an anti-corrosion layer.

15. The method as claimed in claim 1, wherein the first sprue (9) is arranged outside a region of the coating (4) that is visible in the fitted state.

16. The method as claimed in claim 1, wherein fourth mold cavities are opened after the filling of the first mold cavity and/or second mold cavity, and further plastic being injected into said fourth mold cavities.

* * * * *